July 27, 1965 R. W. CLARKE 3,197,657

ELECTRICAL LOGICAL CIRCUIT

Filed Dec. 12, 1962

INVENTOR.
RAYMOND W. CLARKE
BY
Frank R. Jifani
AGENT

United States Patent Office 3,197,657
Patented July 27, 1965

3,197,657

ELECTRICAL LOGICAL CIRCUIT

Raymond William Clarke, Smallfield, Horley, England, assignor to North American Philips Company, Inc., New York, N.Y., a corporation of Delaware Filed Dec. 12, 1962, Ser. No. 244,055
Claims priority, application Great Britain, Dec. 21, 1961, 45,835/61
4 Claims. (Cl. 307—88.5)

Figure 1:
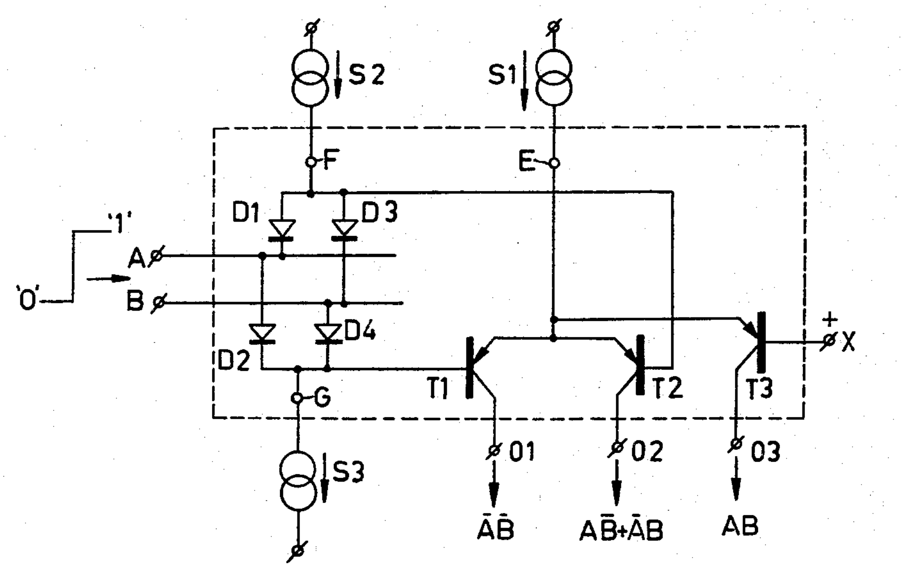

This invention relates to electrical logical circuits and particularly to binary circuits of the half-adder type. The invention also relates to circuits of a type which will be referred to as "equivalence" circuits. The latter perform the function of providing an output only when all the inputs are the same, i.e. all the inputs are "0" or "1".

The circuits to which the invention relates are suitable for modes of operation in which the inputs are essentially voltage inputs and the outputs are essentially current outputs.

Logical circuits are known which comprise a plurality of signal input terminals, a pair of transistors having their emitters connected to a common constant-current supply terminal, a signal output terminal connected to a collector of the transistor pair, and a number of pairs of asymmetrically conductive paths equal to the number of signal input terminals; the paths of each of said pairs of paths are connected in series with each other with the same low-impedance direction of conduction between the two base electrodes of the transistor pair; the junction of each pair of paths is connected to one of the signal input terminals and each base electrode of the transistor pair is connected to a further constant-current supply terminal, one of which terminals is adapted for connection to a source having such polarity as to pass current into the system of asymmetrically conductive paths while the other terminal is adapted for connection to a source having such polarity as to take current from said system of paths.

When such a circuit is connected to the necessary constant-current supplies, the transistors act as a long-tail pair. Various conditions should be met for connecting the circuit to the various necessary external circuits (collector loads, constant-current supplies, supplies of input signals and D.C. voltage). One of these is the prevention of transistor bottoming.

Either or both collectors may be used as output terminals. A 2-input circuit provides an exclusive-OR output at one collector and an "equivalence" output (as defined above) at the other collector of the transistor pair.

It is an object of the present invention to provide such a circuit with additional circuitry for diverting current from the emitters of the transistor pair in such manner as to provide an additional logical function. It is a further object of the invention to add circuitry to a 2-input exclusive-OR circuit for converting such circuit into a half-adder circuit.

According to the present invention, a logical circuit arrangement comprises a circuit of the type mentioned above in combination with a third transistor having its emitter connected to the emitters of the transistor pair, its base connected to a bias supply point and its collector connected to an additional logical output terminal.

The conditions to be met in the prior art also apply in the present case to the transistor pair. Furthermore, the condition that bottoming should be prevented also applies to the third transistor.

As in the prior art, the supplies required for the various constant-current supply terminals are so-called "constant-current" sources in the sense used herein that their internal impedances are large compared with the relevant impedances of the logical circuit. In the simplest case each of these sources may be constituted by a resistance connected to one of the D.C. supply lines of the logical circuit, the supply voltages being given appropriately high values.

Preferably each asymmetrically conductive path is constituted by a semi-conductor diode.

The connections between the emitters of the transistor pair and their common constant-current supply terminal are not necessarily direct connections, and an example will be given in which each of said connections is constituted by an auxiliary diode.

If the number of inputs is greater than two, the logic functions performed are not the more usual functions. For example, in the case of a circuit with three input terminals and six diodes the first transistor of the pair provides an output when all inputs are absent, the second transistor of the pair provides an equivalence output (i.e. when all inputs are equal) and the third transistor provides an AND output.

When the number of inputs is two the circuit can operate as a half-adder with the second transistor of the pair providing a sum output, and the third transistor providing a carry output. Circuits of this character will now be described by way of example with reference to the accompanying drawing as applied to p-n-p junction transistors.

The functions indicated in conventional manner at the output terminals in the drawing correspond to the assumption (adopted in the following description) that a "1" is represented by the presence of current and a "0" is represented by the absence of current. (If this assumption were reversed, the circuit would perform a different set of functions.)

Referring now to FIGURE 1, the exclusive-OR part of the logical circuit comprises signal input terminals A and B, a pair of transistors T1 and T2 having their emitters connected to a common constant-current supply terminal E, two signal output terminals (O1 and O2) connected to the collectors of the two transistors of the two transistor pair, and two asymmetrically conductive paths each of which paths contains two diodes. The diodes of each path (D1–D2 or D3–D4) are connected in series with each other between the two electrodes of the two transistors of the transistor pair with their junction connected to one of the signal input terminals.

The terminal E is shown connected to a constant-current source S1.

Each base electrode of the transistor pair is connected to a further constant-current supply terminal (G, F) one of which terminals (F) is shown connected to a source S2 having such polarity as to pass current into the system of asymmetrically conductive paths D1, D2 and D3, D4 while the other terminal (G) is shown connected to a source S3 having such polarity as to take current from said two paths. (It will be assumed that S2 and S3 supply substantially equal currents though this is not essential when A, B are fed by predominantly voltage sources.)

A "1" is represented in FIGURE 1 as a positive-going input, and this is required for half-adder operation with a carry output. The circuit can work with pulse inputs or D.C. inputs.

The circuit according to the invention has three transistors having a common emitter circuit with their collectors connected to three output terminals, the third transistor being shown at T3 with an output terminal O3 and a bias supply point X. This modifies the output functions which are available.

In the case of two inputs and two transistors the circuit could be used as an equivalence or as an exclusive-OR circuit. By adding the third transistor T3 the half-adder function can be obtained for positive inputs. In the three-transistor circuit of FIG. 1 the current routing is different in all three states. The base bias potential $V_x$ of transistor T3 is such that T3 conducts when both inputs are positive (i.e. "1") and cut off in the other conditions. The design of the circuit is such that only one transistor is conducting at any one time.

A detailed numerical example of the operation will now be given using the following assumptions:

(a) For a transistor to be cut off, its base-emitter voltage ($Vbe$) must be zero or positive (i.e. base positive with reference to emitter);

(b) The transistors have an effective conduction threshhold at $Vbe=-0.3$ v. (this does not accord strictly with practical transistor characteristics which have no such sharp transition, but the simplification proves valid and useful for the following explanation);

(c) The diodes have an effective conduction threshold (a similar simplification) at a forward voltage $Vf=0.4$ v. (a value equal to or smaller than 0.3 (of (b) above) could be used but 0.4 permits a clearer explanation);

(d) Inputs (A, B) are zero volts for "0" and +1.6 for "1".

On this basis, the operation can be considered for four different input conditions:

(1) *Both inputs "0"*.—Then $A=B=0$ v. Diodes D1, D2, D3 and D4 conduct, so G is at −0.4 v. and F at +0.4 v. Thus if T1 is on, then E is at $-0.4+0.3=-0.1$ v. and so T2 and T3 are off. (T2 is biased off because the P.D. between points F and E is $$V_{FE}=0.4-(-0.1)=+0.5 \text{ v.}$$

and T3 because $V_{XE}=0.8-(-0.1)=+0.9$ v.)

(2) *One "1" input (at A)*.—$A=+1.6$ v. and $B=0$ v. Diodes D2, D3 conduct while diodes D1, D4 are cut off. F is at $0+0.4=+0.4$ v. while G is at $1.6-0.4=+1.2$ v. Therefore T2 is on and E is at $0.4+0.3=+0.7$ v. The P.D. between points G and E and between X and E are $V_{GE}=1.2-0.7=+0.5$ v. and $V_{XE}=0.8-0.7=+0.1$ v. and so T1 and T3 are cut off while T2 is on.

(3) *One "1" input (at B)*.—$A=0$ and $B=+1.6$ v. Diodes D1, D4 conduct while diodes D2, D3 are cut off. The potentials are the same as in state (2).

(4) *Both inputs are "1"*.—$A=B=+1.6$ v. Diodes D1, D2, D3 and D4 are conducting. F is at $$1.6+0.4=+2.0 \text{ v.}$$

while G is at $1.6-0.4=+1.2$ v. Therefore T3 is on and E is at $0.8+0.3=+1.1$ v. so that $V_{GE}=1.2-1.1=+0.1$ v. and $V_{FE}=2.0-1.1=+0.9$ v. Therefore T1 and T2 are cut off.

The constant-current sources S1–S3 may be provided as mere resistances (R1 to R3 respectively) of relatively high values connected to D.C. supply rails $+Vcc$ and $-Vcc$ of sufficiently high voltages (R1 and R2 to $+Vcc$, R3 to $-Vcc$). In this mode of execution, the values and components may, for example, be as follows:

*Table*

| | |
|---|---|
| Transistors T1, T2, T3 | Mullard germanium type ASZ21 |
| Diodes D1 to D4 | Mullard germanium type AAZ13 |
| R1 | 3.6K |
| R2 | 36K |
| R3 | 36K |
| $+Vcc$ | +36 volts |
| $-Vcc$ | −36 volts |

So-called keep-alive circuitry can be used in the circuit described. With alloy-diffused transistors this can give advantages by way of shorter switching delays and no dependence on maximum permissible reverse base-emitter voltages.

Figure 2:
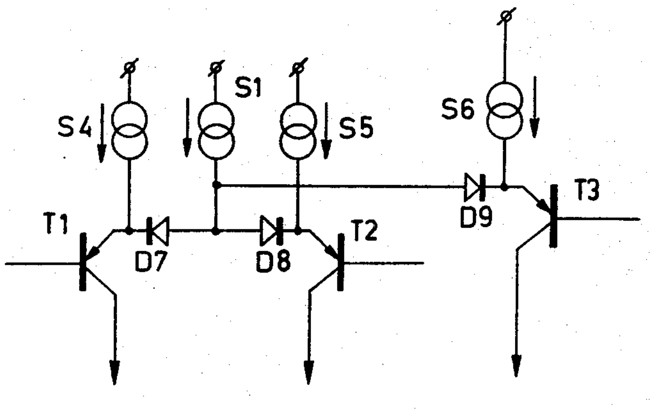

The second advantage (and, to some extent, the first) can be secured by the mere addition of an auxiliary diode in series with each emitter lead. To secure both advantages fully, it is sufficient to add to such diodes constant-current auxiliary sources S4, S5, S6 as shown in FIGURE 2, where the additional diodes are indicated as D7, D8, D9. In this circuit the transistors switch between a low current regime (corresponding to S4 or S5 or S6) and a high current regime (corresponding to $S1+S4$ or $S1+S5$ or $S1+S6$). This reduces the change in $Vbe$ and so reduces the delay due to the relatively large emitter depletion-layer capacitance of the transistors. The on-off current switching occurs in the diodes and these have a lower depletion-layer capacitance. Sources S4–S6 may be constituted by resistances connected to appropriate D.C. supply lines as in the case of sources S1–S3.

According to a modification of the invention, it is possible to add a third transistor to a circuit having three or more input terminals. In this case, as in the circuits of FIGURES 1 and 2, the third transistor has its emitter connected to the emitters of the transistor pair, its base connected to a bias supply point and its collector connected to an additional logical output terminal. The logical functions of such a circuit will, of course differ from those of a half-adder.

What is claimed is:

1. A logical circuit comprising a plurality of signal input terminals, a pair of transistors having their emitters connected to a common constant-current supply terminal, a signal output terminal connected to a collector of the transistor pair, a plurality of pairs of asymmetrically conductive paths equal in number to the number of signal input terminals, the paths of each of said pairs being connected in series with each other with the same low-impedance direction of conduction between the two base electrodes of the transistor pair with their junction connected to one of the signal input terminals, each base electrode of the transistor pair being connected to a further constant-current supply terminal one of which terminals is provided for connection to a source having such polarity as to pass current into the system of asymmetrically conductive paths while the other terminal is for connection to a source having such polarity as to take current from said system of paths and a third transistor having its emitter connected to the emitters of the transistor pair, its base connected to a bias supply point and its collector connected to an additional logical output terminal.

2. A circuit arrangement as claimed in claim 1, further comprising a plurality of resistors connected from the constant-current supply terminals to D.C. power supply terminals, said resistors having resistance values which are large compared with the impedances of the logical circuit.

3. A logical circuit comprising a plurality of signal input terminals, a pair of transistors having their emitters connected to a common constant-current supply terminal, a signal output terminal connected to a collector of the transistor pair, a two-input AND gate for each combination of two-input terminals with its inputs connected to the respective signal input terminals, a first OR gate with each of its inputs connected to one of the AND gate outputs and its output connected to one base of the transistor pair, a second OR gate with each of its inputs connected to one of the signal input terminals and its output connected to the other base of the transistor pair, each base of the transistor pair being connected to a further constant-current supply terminal one of which terminals is provided for connection to a source having such polarity as to pass current into the system of gates while the other terminal is for connection to a source having such polarity as to take current from said system of gates, and a third transistor having its emitter connected to the emitters of the transistor pair, its base connected to a bias supply point and its collector connected to an additional logical output terminal.

4. A circuit arrangement as claimed in claim 3, further comprising a plurality of resistors connected from the constant-current supply terminals to D.C. power supply terminals, said resistors having resistance values which are large compared with the impedances of the logical circuit.

References Cited by the Examiner

IBM Technical Disclosure Bulletin, by Walsh, vol. 2, No. 2, August 1959, page 51.

ARTHUR GAUSS, *Primary Examiner.*